July 8, 1941.   H. BANY   2,248,602
CONTROL EQUIPMENT FOR PRIME MOVER ELECTRIC GENERATING PLANTS
Filed Nov. 15, 1940   2 Sheets-Sheet 1

Inventor:
Herman Bany,
by Harry E. Dunham
His Attorney.

Patented July 8, 1941

2,248,602

UNITED STATES PATENT OFFICE 2,248,602

CONTROL EQUIPMENT FOR PRIME MOVER ELECTRIC GENERATING PLANTS

Herman Bany, Lansdowne, Pa., assignor to General Electric Company, a corporation of New York Application November 15, 1940, Serial No. 365,777

8 Claims. (Cl. 290—4)

My invention relates to control equipments for prime mover electric generating plants and particularly to an equipment for controlling the paralleling of a prime mover driven alternating current generator.

One object of my invention is to provide an improved paralleling arrangement of the type disclosed and claimed in the copending application Serial No. 360,251, filed October 8, 1940, by W. A. Bagley, and assigned to the same assignee as this application.

In the arrangement disclosed in the aforesaid application the disconnected generator is first excited to a desired value above the synchronizing value, and the speed of the generator is then regulated in response to the difference between the frequencies of the generator and the electric system to which the generator is to be connected so as to reduce the frequency difference. When the frequency difference is below a predetermined value and a predetermined phase relation exists between the voltages of the generator and the system, the excitation of the generator is reduced below its synchronizing value and then the generator is connected to the system and the excitation is restored to a synchronizing value. In accordance with my invention, instead of entirely disconnecting the generator field winding from the source of excitation in order to reduce the generator excitation to a value below its synchronizing value, which is the arrangement disclosed in the aforesaid application, I merely reduce the excitation to a value which will produce a subnormal generator voltage which is reasonably free from variations in magnitude due to previous magnetizations of the generator field circuit, but not sufficient to pull the generator into synchronism and then control the connection of the generator to the system in response to the phase relation between subnormal generator voltage and the normal voltage of the system.

Figure 1:
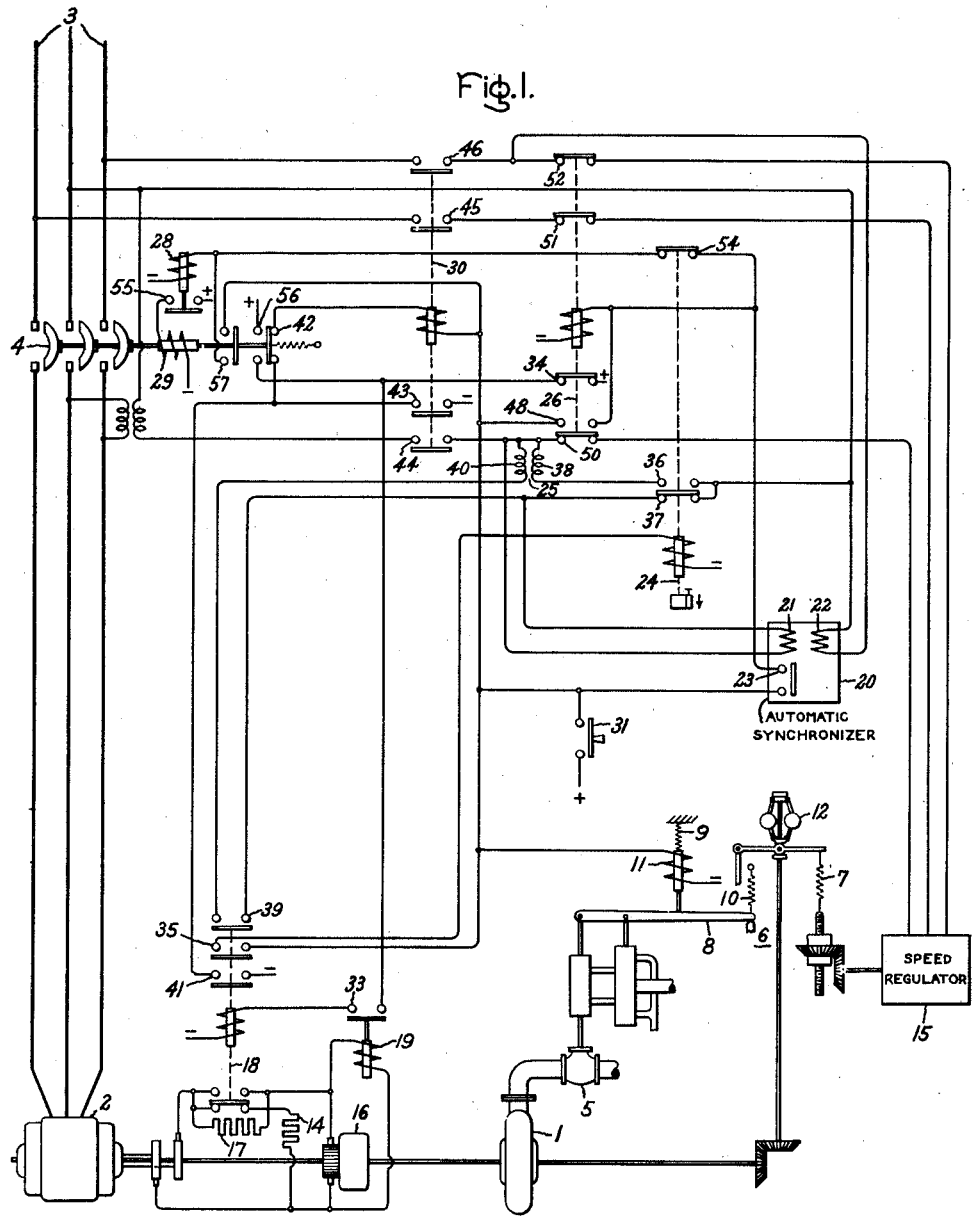
Figure 2:
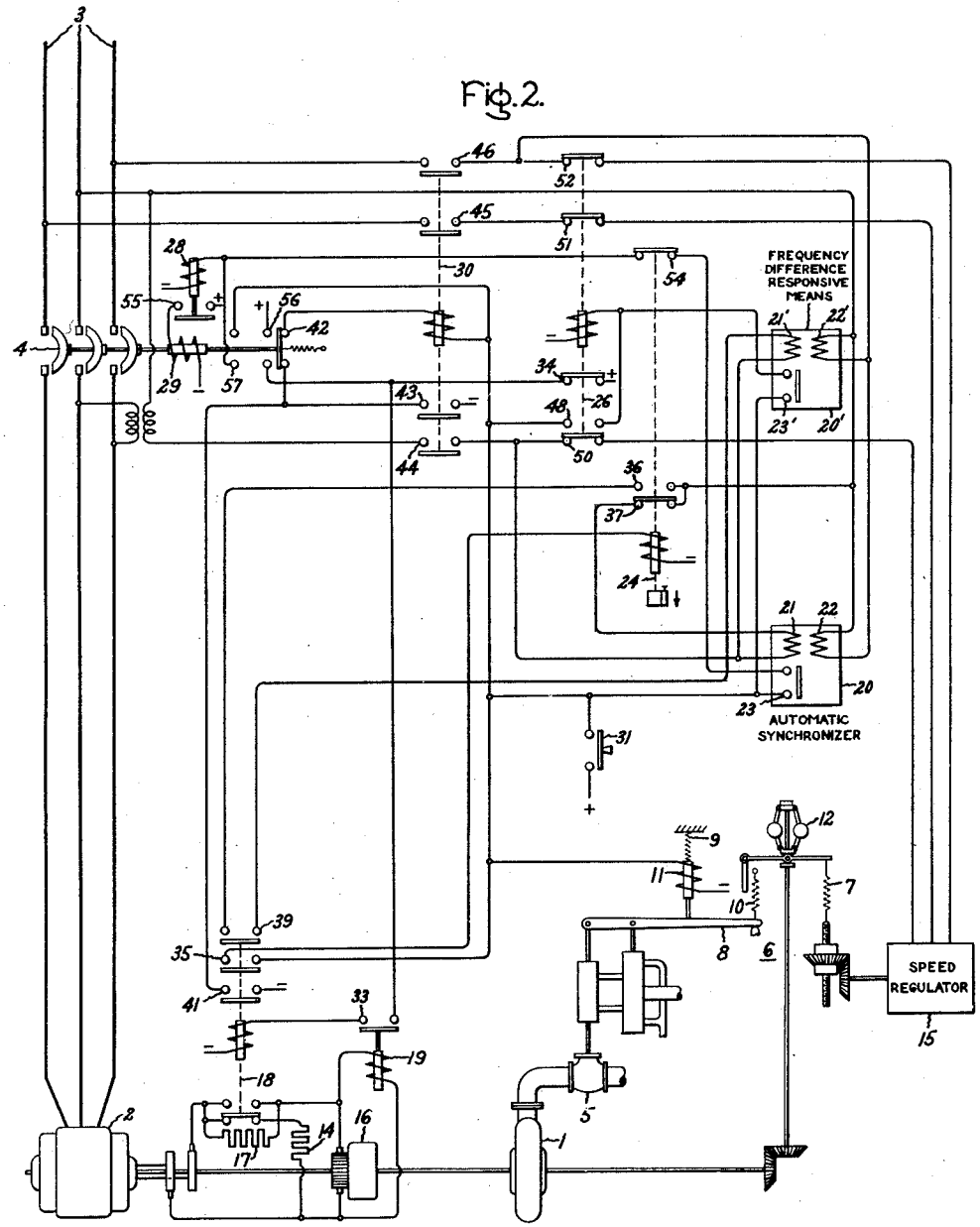

My invention will be better understood from the following description when taken in connection with the accompanying drawings, Fig. 1 of which diagrammatically illustrates a control arrangement for a prime mover electric generating plant embodying my invention and Fig. 2 of which is a modification of the arrangement shown in Fig. 1, and the scope of my invention will be pointed out in the appended claims.

Referring to Fig. 1 of the drawings, I represents a prime mover driving a polyphase generator 2 which is arranged to be connected to an energized polyphase circuit 3 by means of a suitable circuit breaker 4. The prime mover I is supplied with operating fluid through a valve 5 which is maintained in a position dependent upon the speed of the prime mover I by means of a flyball governor 6, the flyballs 12 of which are driven in any suitable manner at a speed proportional to the speed of the prime mover and operate against the tension of an adjustable spring 7. The position of the flyballs 12 of the flyball governor 6 control the position of the movable member 8 which in turn controls the opening position of the valve 5. As diagrammatically shown in the drawings, the movable member 8 is in its valve closed position and is held in that position by a closing spring 9 against the bias of an opening spring 10 as long as a governor magnet 11 is deenergized. When it is desired to start the prime mover I, it is necessary to energize the governor magnet 11, which is so arranged that its energization moves the closing spring 9 out of operative relation with the movable member 8 and allows the opening spring 10 to move the movable member 8 to a valve opening position. While the governor magnet 11 is energized, the gate-opening position of the member 8 depends upon the position of the flyballs 12 of the governor 6, and this position of the flyballs 12 for any given speed of the prime mover may be varied by changing the tension of the adjustable spring 7 in any suitable manner. In the particular embodiment shown the tension of the spring 7 is changed during the starting operation of the prime mover I in response to the difference between the frequencies of the generator 2 and the system 3 so as to maintain the frequency difference below a predetermined value. A speed regulating arrangement, which is particularly adapted for use in the embodiment of my invention shown in the drawings, is disclosed in detail in United States Letters Patent 1,843,788 which is assigned to the assignee of this application. Therefore, in order to simplify the present disclosure, I have illustrated the speed regulating arrangement merely by a rectangle 15 since my present invention does not relate to the details thereof.

An exciter 16, which may be of any suitable type, is provided for supplying exciting current to the field winding of the generator 2. As shown, the exciter 16 is a dynamo-electric machine driven by the prime mover I and connected in series with a suitable current limiting means such as a resistor 17 across the terminals of the generator field winding. The resistor 17 is designed so that with normal exciter voltage the amount of exciting current supplied through the resistor to the generator field winding is sufficient to produce a generator voltage which is reasonably free from variations in magnitude due to previous magnetizations of the generator field structure but is not sufficient to pull the generator into synchronism when connected to the circuit 3. The resistor 17 is arranged to be short-circuited by a switch 18 when in its closed position. The closing of the switch 18 is effected during the starting operation of the plant as soon as the exciter voltage builds up to a sufficient value to effect the operation of a voltage relay 19 which is connected across the exciter terminals. When in its open position, the switch 18 connects a discharge resistor 14 across the terminals of the generator field winding.

For initiating the synchronizing operation in response to a predetermined phase relation between the voltages of the generator 2 and the circuit 3, when the frequency difference between them is less than a predetermined value, I provide an automatic synchronizer 20 which may be of the type disclosed in detail in United States Letters Patent 2,168,175 granted to the assignee of this application. Since my present invention does not relate to the details of the automatic synchronizer, I have represented the synchronizer merely by a rectangle containing two windings 21 and 22 and the contacts 23. The winding 22 is arranged to be connected across one phase of the supply circuit 3, and the winding 21 is arranged to be connected across the corresponding phase of the generator 1 when an associated control relay 24, which is energized when the field switch 18 is closed, is in its deenergized position. When the control relay 24 is energized, it transfers the connections of the winding 21 so that a step-down transformer 25 is interposed in the circuit of the winding 21 for a purpose hereinafter set forth.

The initial closing of the contacts 23 of the synchronizer during the starting operation of the plant effects the operation of an associated control relay 26 which in turn removes the speed regulator 15 from the control of the voltages of the generator 2 and the circuit 3 so as to prevent further regulation of the generator speed. The operation of the control relay 26 also effects the opening of the switch 18 which in turn effects the deenergization of the control relay 24, which is arranged in any suitable manner, so that it does not return to its normal position until after it has been deenergized for a predetermined time. The restoration of the control relay 24 to its normal position reconnects the winding 21 to the generator 2 independently of the step-down transformer 25 so that the winding 21 is sufficiently energized by the subnormal generator voltage to effect the operation of the automatic synchronizer 20. As soon as the relay 24 is restored to its normal position and the contacts 23 of the automatic synchronizer 20 are again closed, an energizing circuit for a control relay 28 is completed, and this relay in turn completes an energizing circuit for the closing coil 29 to close the circuit breaker 4 and thereby connect the generator 2 to the circuit 3. Also the closing of the circuit breaker 4 effects the subsequent closing of the switch 18 so that the generator excitation is restored to a value sufficient to pull the generator into synchronism. The closing of the circuit breaker 4 also effects the operation of an associated control relay 30 to render the automatic synchronizer 20 non- responsive to the phase relation of the voltages of the generator 2 and the circuit 3.

For controlling the starting and stopping of the prime mover plant, I provide a manually controlled switch 31 which is closed when it is desired to start the plant and which is opened when it is desired to shut down the plant.

The operation of the embodiment of my invention shown in Fig. 1 of the drawings is as follows:

When it is desired to start up the plant, the control switch 31 is closed so as to complete an energizing circuit for the governor magnet 11 which moves the closing spring 9 out of operative relation with the movable member 8 of the governor 6 so that the opening spring 10 moves the member 8 in a direction to effect the opening of the valve 5. As soon as the prime mover starts to rotate and has accelerated to a predetermined speed, the flyballs 12 operate to control, in a well known manner, the position of the member 8.

As soon as the exciter voltage builds up to a predetermined value, the exciter voltage relay 19 closes its contacts 33 and completes through contacts 34 of relay 26 an energizing circuit for the closing coil of the switch 18 so that normal excitation is applied to the generator field winding and the generator voltage builds up to substantially its normal value. The closing of the contacts 41 of the switch 18 completes, through the auxiliary contacts 42 of the circuit breaker and the contacts of the control switch 31, an energizing circuit for the coil of relay 30. The contacts 35 of the switch 18 complete through the contacts of the control switch 31 an energizing circuit for the coil of relay 24. By closing its contacts 36, relay 24 completes, through the contacts 44 of the relay 30, an energizing circuit for the primary winding 38 of the step-down transformer 25 across the same phase conductors of the generator 2 across which the winding 21 is directly connected when the contacts 44 and 37 are simultaneously closed. The transformer 25 is arranged so that, when the generator voltage is substantially normal, the secondary voltage of the transformer 25 is substantially equal to the subnormal generator voltage obtained by opening the field switch 18 while the generator 2 is running at its normal speed. The closing of the auxiliary contacts 39 of the switch 18 connects the winding 21 of the automatic synchronizer across the secondary winding 40 of the step-down transformer 25.

The closing of the contacts 43 of the relay 30 completes a shunt circuit around the contacts 41 so that the subsequent opening of the switch 18 does not effect the deenergization of the control relay. The closing of the contacts 44, 45 and 46 of the control relay establishes the necessary connection from the speed regulator 15 and the automatic synchronizer 20 to the generator 2 and the circuit 3 so the speed regulator 15 and the automatic synchronizer are controlled by the frequency difference and the phase relation of the voltages of the generator 2 and the circuit 3. The speed regulator 15 operates in response to the difference between the frequencies of the generator 2 and the circuit 3 to adjust the governor setting in a well known manner so as to decrease the frequency difference, and the automatic synchronizer 20 operates to close the contacts 23 at a predetermined phase angle between the voltages of the generator 2 and the circuit 3 when the frequency difference is below a predetermined value.

As soon as the frequency difference and the phase relation of the voltages are such that the contacts 23 close, a circuit is completed, through the contacts of the control switch 31, for the coil of control relay 26. The closing of the contacts 48 of the relay 26 completes a shunt circuit around the contacts 23 so that the relay 26 remains energized as long as the control switch 31 remains closed. The opening of the contacts 34 of the relay 26 interrupts the circuit of the coil of the switch 18, which opens and removes the shunt from around the resistor 17 so that the generator voltage is reduced to a subnormal value which is reasonably free from variations in magnitude due to the previous magnetization of the field structure. The opening of the contacts 50, 51 and 52 of the relay 26 interrupts the circuits to the speed regulator 15 so as to prevent further regulation of the speed of the generator 2.

After the switch 18 has remained open long enough to allow the generator voltage to decrease to the desired subnormal value, the control relay 24, the circuit of which is opened by the contacts 35 of the switch, opens its contacts 36 and closes its contacts 37 so that the winding 21 is connected to the generator phase conductors independently of the step-down transformer 25.

As soon as the phase relation of the subnormal voltage of the generator 2 and the normal voltage of the circuit 3 are such as to close the automatic synchronizer contacts 23 after the control relay 24 is restored to its normally deenergized position, a circuit is completed for the control relay 28 through contacts 54 of control relay 24 and the contacts of the control switch 31. By closing its contacts 55, the control relay 28 completes an energizing circuit for the closing coil 29 of the circuit breaker 4 so that the subnormally excited generator 2 is connected to the circuit 3. The closing of the auxiliary contact 56 of the circuit breaker 4 completes through contacts 33 of the exciter voltage relay 19 an energizing circuit for the closing coil of the field switch 18 so that the generator excitation is restored to its normal value in order to pull the generator into synchronism with the circuit 3. The closing of the auxiliary contacts 57 of the circuit breaker 4 completes a shunt around the contacts 23 and 54 in the circuit of the control relay 28, and the opening of the auxiliary contacts 42 of the circuit breaker 4 interrupts the circuit of the control relay 30 which in turn by opening its contacts 44, 45 and 46 renders the automatic synchronizer 20 inoperative. The gate 5 may then be adjusted in any suitable manner to cause the generator 2 to assume its share of the load connected to the circuit 3.

In the embodiment of my invention shown in Fig. 1, it is necessary for the frequency difference to remain within the operating range of the automatic synchronizer 20 during the time interval elapsing between the energization of the relay 26 and the subsequent operation of the synchronizer. Since the energization of the relay 26 renders the speed regulator inoperative, it is quite possible in some installations for the frequency difference to increase materially before the time relay 24 drops out. In Fig. 2 I have shown a modification of the embodiment of my invention shown in Fig. 1 which may be used in such installations. Instead of having the automatic synchronizer 20 open the switch 18 and also render the speed regulator inoperative when the frequency difference decreases below a predetermined value, I provide in this modification a separate frequency difference responsive device 20' which is arranged to close its contacts 23' only when the frequency difference decreases below a predetermined value below the maximum value at which the automatic synchronizer 20 can close its contacts 23.

Since the frequency difference responsive means 20' may be an automatic synchronizer of the type disclosed in detail in the heretofore mentioned United States Letters Patent 2,168,175, I have represented the frequency difference responsive means 20' in Fig. 2 merely by a rectangle in which is shown two windings 21' and 22' and the contacts 23'. The winding 21' is arranged to be connected by the contacts 36 of the time relay 24 across the same phase conductors of the generator 2 that the winding 21 is connected across by the contacts 37 of the relay 24 when it is energized. The frequency difference responsive means 20' is arranged so that it does not close its contacts 23' until the frequency difference is less than a predetermined value below the maximum frequency difference at which the automatic synchronizer 20 closes its contacts 23. The range of frequency difference over which the automatic synchronizer closes its contacts 23 is greater than the range over which the frequency difference responsive means 20' closes its contacts 23' by an amount sufficient to take care of any increase in the frequency difference that may occur during the time interval elapsing between the closing of the contacts 23' and 23 during the synchronizing operation.

The operation of the modification shown in Fig. 2 is as follows:

After the plant has been started in response to the closing of the control switch 31, the relays 18, 19, 24 and 30 are energized to effect the operation of the speed regulator 15 in the same manner as in the embodiment shown in Fig. 1. As soon as the frequency difference decreases below a predetermined value, the frequency difference responsive means 20' closes its contacts 23' and completes an energizing circuit for the relay 26 which then operates in the same manner as in Fig. 1 to render the speed regulator 15 inoperative, to reduce the field excitation of the generator 2 to its predetermined subnormal value and to deenergize the time relay 24.

As soon as the phase relation of the subnormal voltage of the generator 2 and the normal voltage of the generator 3 are such as to close the automatic synchronizer contacts 23 after the control relay 24 has closed its contacts 37, the control relay 28 is energized in the same manner as in Fig. 1 to close the circuit breaker 4 and to restore the generator excitation to its normal value in order to pull the generator into synchronism with the circuit 3.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. An arrangement for synchronizing an alternating current generator with an alternating current system comprising means for supplying excitation to said generator, means dependent upon the relative frequencies of the voltages of said generator and system for regulating the speed of said generator to reduce the frequency difference, means responsive to a frequency difference below a predetermined value for reducing the excitation of said generator and means responsive to a predetermined phase relation between said system voltage and the reduced voltage of said generator produced by said reduced excitation for connecting said generator to said system and then increasing the excitation of said generator.

2. An arrangement for synchronizing an alternating current generator with an alternating current system comprising means for supplying excitation to said generator, means dependent upon the relative frequencies of the voltages of said generator and system for regulating the speed of said generator to reduce the frequency difference, means responsive to a predetermined range of frequency difference for reducing the excitation of said generator, and means responsive to a predetermined phase relation between said system voltage and the reduced voltage of said generator produced by said reduced excitation during a different predetermined range of frequency difference for connecting said generator to said system and then increasing the excitation of said generator.

3. An arrangement for synchronizing an alternating current generator with an alternating current system comprising means supplying sufficient excitation to said generator to produce a synchronizing generator voltage, means dependent upon the relative frequencies of the voltages of said generator and system for regulating the speed of said generator to reduce the frequency difference, means responsive to a frequency difference below a predetermined value for reducing the excitation of said generator to a predetermined subnormal value below the synchronizing value, and means responsive to a predetermined phase relation between said system voltage and the voltage of said subnormally excited generator for connecting said generator to said system and then restoring the excitation of said generator to a synchronizing value.

4. An arrangement for synchronizing an alternating current generator with an alternating current system comprising means supplying sufficient excitation to said generator to produce a synchronizing generator voltage, means dependent upon the relative frequencies of the voltages of said generator and system for regulating the speed of said generator to reduce the frequency difference, means responsive to a frequency difference below a predetermined value for rendering said speed regulating means inoperative and for reducing the excitation of said generator to a predetermined subnormal value below the synchronizing value, and means responsive to a predetermined phase relation between said system voltage and the voltage of said subnormally excited generator for connecting said generator to said system and then restoring the excitation of said generator to a synchronizing value.

5. In combination, an energized alternating current system, an alternating current generator, means for connecting said generator to said system, a source of excitation connected to the field winding of said generator, switching means for reducing the amount of exciting current supplied by said source to the generator field winding, means dependent upon the relative frequencies of the voltages of said generator and system for regulating the speed of said generator to reduce the frequency difference, means responsive to the frequency difference decreasing below a predetermined value for effecting the operating of said switching means, means responsive to a predetermined phase relation between the voltage of said system and said generator while the excitation of the generator field winding is reduced for connecting said generator to said system, and means responsive to the connection of said generator to said system for rendering said switching means inoperative to reduce the generator excitation.

6. In combination, an energized alternating current system, an alternating current generator, means for connecting said generator to said system, a source of excitation connected to the field winding of said generator, switching means for reducing the amount of exciting current supplied by said source to the generator field winding, means dependent upon the relative frequencies of the voltages of said generator and system for regulating the speed of said generator to reduce the frequency difference, means responsive to the frequency difference being below a predetermined value for rendering said speed regulating means inoperative and for effecting the operating of said switching means, means responsive to a predetermined phase relation between the voltages of said system and said generator after said switching means is operated for connecting said generator to said system, and means responsive to the connection of said generator to said system for rendering said switching means inoperative to reduce the generator excitation.

7. In combination, an energized alternating current system, an alternating current generator, a switch for connecting said generator to said system, a source of excitation connected to the generator field winding, switching means for reducing the amount of exciting current supplied by said source to the generator field winding, means dependent upon the relative frequencies of the voltages of said generator and system for regulating the speed of said generator to reduce the frequency difference, control means responsive to a predetermined phase relation between the voltages of said system and generator when the frequency difference is below a predetermined value including a control winding, means controlled by said switching means for establishing different connections between said control winding and said generator dependent upon the excitation of said generator, means responsive to the operation of said control means for effecting the operation of said switching means, and means responsive to the operation of said control means a predetermined time after the operation of said switching means for operating said switch and for rendering said switching means inoperative to reduce the generator excitation.

8. In combination, an energized alternating current system, an alternating current generator, a circuit breaker for connecting said generator to said system, a source of excitation connected to the field winding of said generator, current limiting means connected in series with said source and field winding, a closed field switch shunting said current limiting means, means dependent upon the relative frequencies of the voltages of said generator and system for regulating the speed of said generator to reduce the frequency difference, a step-down transformer having a primary winding connected to said generator and a secondary winding, control means responsive to a predetermined phase relation between the voltages of said generator and system including a control winding connected to said secondary winding, means responsive to the operation of said control means for effecting the opening of said field switch, means responsive to the opening of said field switch for effecting the connection of said control winding to said generator independently of said transformer, and means controlled by said phase relation responsive means while said field switch is open for effecting the closing of said circuit breaker in response to a predetermined phase relation between the voltages of said generator and system, and means responsive to the closing of said circuit breaker for reclosing said field switch.

HERMAN BANY.